US008174514B2

(12) United States Patent
Kim

(10) Patent No.: US 8,174,514 B2
(45) Date of Patent: May 8, 2012

(54) DEMULTIPLEXER, AND LIGHT EMITTING DISPLAY USING THE SAME AND DISPLAY PANEL THEREOF

(75) Inventor: Yang-Wan Kim, Suwon-si (KR)

(73) Assignee: Samsung Mobile Display Co., Ltd., Yongin (KR)

( * ) Notice: Subject to any disclaimer, the term of this patent is extended or adjusted under 35 U.S.C. 154(b) by 1025 days.

(21) Appl. No.: 11/165,788

(22) Filed: Jun. 23, 2005

(65) Prior Publication Data

US 2006/0007768 A1 Jan. 12, 2006

(30) Foreign Application Priority Data

Jun. 30, 2004 (KR) ........................ 10-2004-0050608

(51) Int. Cl.
*G06F 3/038* (2006.01)

(52) U.S. Cl. ............ 345/204; 345/214; 345/55; 345/76

(58) Field of Classification Search .............. 345/45-46, 345/55, 76, 80, 82, 100, 204-205, 214, 690; 349/139-152
See application file for complete search history.

(56) References Cited

U.S. PATENT DOCUMENTS 4,870,399 A * 9/1989 Carlson ............ 345/55
4,890,101 A * 12/1989 Carlson ............ 345/55
5,021,774 A * 6/1991 Ohwada et al. ............ 345/90
5,113,181 A * 5/1992 Inoue et al. ............ 345/84
5,126,727 A * 6/1992 Asars ............ 345/76
6,281,891 B1 * 8/2001 DaCosta et al. ............ 345/206
6,452,580 B1 * 9/2002 Edwards et al. ............ 345/100
6,545,518 B2 * 4/2003 Saeki ............ 327/116
6,633,359 B1 * 10/2003 Zhang et al. ............ 349/141
6,700,562 B1 * 3/2004 Knapp et al. ............ 345/98
6,806,862 B1 * 10/2004 Zhang et al. ............ 345/103
6,859,247 B2 * 2/2005 Murade et al. ............ 349/139
7,411,535 B2 * 8/2008 Tanaka ............ 341/144
7,550,764 B2 * 6/2009 Jang et al. ............ 257/57
7,714,826 B2 * 5/2010 Jang et al. ............ 345/98
2003/0085885 A1 * 5/2003 Nakayoshi et al. ............ 345/205
2003/0107564 A1 * 6/2003 Miyazawa ............ 345/204
2003/0179164 A1 * 9/2003 Shin et al. ............ 345/76

* cited by examiner

*Primary Examiner* — Jason Mandeville
(74) *Attorney, Agent, or Firm* — Christie, Parker & Hale, LLP

(57) ABSTRACT

A demultiplexer, a light emitting display using the same, and a display panel thereof. The light emitting display includes: an image signal line for supplying a data signal for displaying an image through a plurality of first signal lines; a display area including a plurality of data lines for transmitting the data signal, a plurality of scan lines for transmitting a selection signal, and a plurality of pixels coupled to the data lines and the scan lines; a data driver for sequentially outputting a plurality of first control signals; a scan driver for sequentially applying the selection signal to the scan lines; and a demultiplexer including a plurality of switches for transmitting the data signal to at least two data lines in response to the first control signals. One of the first control signals is transmitted in at least two directions to switches in at least one of the switching units.

13 Claims, 7 Drawing Sheets

DEMULTIPLEXER, AND LIGHT EMITTING DISPLAY USING THE SAME AND DISPLAY PANEL THEREOF

CROSS REFERENCE TO RELATED APPLICATION

This application claims priority to and the benefit of Korean Patent Application No. 10-2004-0050608 filed on Jun. 30, 2004 in the Korean Intellectual Property Office, the entire content of which is incorporated herein by reference.

BACKGROUND OF THE INVENTION

1. Field of the Invention

The present invention relates to a demultiplexer, and a light emitting display using the demultiplexer and a display panel thereof. More specifically, the present invention relates to an organic light emitting diode (OLED) display.

2. Discussion of the Related Art

Generally, OLED displays emit light by electrically exciting an organic compound. Such an OLED display includes N×M organic light emitting cells arranged in the form of a matrix, and displays an image by driving the organic light emitting cells, using voltage or current. Such organic light emitting cells are also called "OLEDs" because they have diode characteristics. As shown in FIG. 1, each organic light emitting cell has a structure including an anode electrode layer (e.g., ITO), an organic thin film, and a cathode electrode layer (e.g., metal). The organic thin film has a multi-layer structure including an emitting layer (EML), an electron transport layer (ETL), and a hole transport layer (HTL), to achieve an improved balance between electrons and holes, and thus, to achieve an enhancement in light emitting efficiency. The organic thin film also includes an electron injecting layer (EIL) and a hole injecting layer (HIL). Such organic light emitting cells are arranged in the form of an N×M matrix to form an OLED display panel.

For driving methods for such an OLED display panel, there are a passive matrix type driving method and an active matrix type driving method using thin film transistors (TFTs). In accordance with the passive matrix type driving method, anodes and cathodes are arranged to be orthogonal to each other so that a desired line to be driven is selected. In accordance with the active matrix type driving method, thin film transistors are coupled to respective indium tin oxide (ITO) pixel electrodes in an OLED display panel so that the OLED display panel is driven by a voltage maintained by the capacitance of a capacitor coupled to the gate of each thin film transistor.

FIG. 1 is a block diagram of a conventional OLED display.

As shown in FIG. 1, the conventional OLED display includes a display panel 10 including a plurality of pixels 11, a scan driver 20, a data driver 30, and switches SW1 to SWm.

The scan driver 20 sequentially transmits a selection signal to a plurality of scan lines S1 to Sn, and the data driver 30 sequentially outputs control signals X1 to Xm for turning on the switches SW1 to SWm.

The switches SW1 to SWm form a demultiplexer for demultiplexing an image signal transmitted from an image signal line and for transmitting the image signal to data lines D1 to Dm, and sequentially transmit the image signal to the data lines D1 to Dm in response to the control signals X1 to Xm.

In the conventional OLED display, the data driver 30 is required to have output terminals corresponding to the data lines, and to sequentially apply the image signal to the respective data lines D1 to Dm for a horizontal period. Therefore, it is limited to programming the image signal to one data line at a time.

To provide more time for programming each data line, multiple data lines should be driven at the same time by dividing and transmitting the image signal to a plurality of signal lines, and turning on the plurality of switches at the same time when a signal (e.g., signal X1) is applied by a data driver.

However, when one signal output from the data driver 30 is transmitted to a plurality of switches, a time for a control signal X being transmitted to the plurality of switches has a variation. Accordingly, an image signal is not correctly transmitted to the data lines D1 to Dm.

SUMMARY OF THE INVENTION

In one exemplary embodiment of the present invention, a method for reducing a variation in transmission time of a control signal of a data driver, and accurately applying an image signal to a data line, is provided.

Additional features of the invention will be set forth in the description which follows, and in part will be apparent from the description.

In an exemplary embodiment according to the present invention, a light emitting display is disclosed. The light emitting display includes: an image signal line for supplying a data signal for displaying an image through a plurality of first signal lines; a display area including a plurality of data lines for transmitting the data signal, a plurality of scan lines for transmitting a selection signal, and a plurality of pixels coupled to the data lines and the scan lines; a data driver for sequentially outputting a plurality of first control signals; a scan driver for applying the selection signal to the scan lines; and a demultiplexer including a plurality of switching units for respectively transmitting the data signal to at least two data lines among the plurality of data lines in response to the first control signals. At least one of the switching units includes a plurality of switches for transmitting the data signal to the at least two data lines in response to a corresponding one of the first control signals. The plurality of switches are respectively coupled between the plurality of first signal lines and the at least two data lines. The corresponding one of the first control signals is applied to the at least one of the switching units at a predetermined point, such that the corresponding one of the first control signals is transmitted to the switches in at least two directions with respect to the predetermined point.

In another exemplary embodiment according to the present invention, a display panel is provided. The display panel includes: an image signal line for supplying a data signal for displaying an image through a plurality of first signal lines; a display area including a plurality of pixel circuits for displaying the image corresponding to the data signal and a plurality of data lines for transmitting the data signal to the pixel circuits; a data driver for sequentially outputting a plurality of first control signals; a plurality of switching units for sequentially transmitting the data signal to the data lines in response to the first control signals; and a plurality of second signal lines for transmitting the first control signals to the switching units. At least one of the switching units includes a plurality of switching transistors that are respectively coupled between the plurality of first signal lines and at least two data lines among the plurality of data lines, and sharing a gate electrode that forms a third signal line. A corresponding one of the second signal lines is coupled to the third signal line so that lengths for transmitting the corresponding one of the first control signals to at least two switching transistors among the plurality of switching transistors are substantially the same as each other.

In yet another exemplary embodiment according to the present invention, a demultiplexer for demultiplexing a data signal which is input through a plurality of first signal lines and for applying the data signal to a plurality of data lines, is provided. The demultiplexer includes a plurality of second signal lines for transmitting a first control signal which is sequentially input, and a plurality of switching units for transmitting the data signal to the data lines in response to the first control signal. At least one of the switching units is coupled between the first signal lines and the data lines, and includes a plurality of switching transistors sharing a gate electrode that forms a third signal line. A corresponding one of the second signal lines is coupled to the third signal line so that the switching transistors are symmetrically formed with respect to the corresponding one of the second signal lines.

BRIEF DESCRIPTION OF THE DRAWINGS

The accompanying drawings, together with the specification, illustrate certain exemplary embodiments of the present invention, and, together with the description, serve to explain the principles of the present invention.

DETAILED DESCRIPTION

Figure 1:
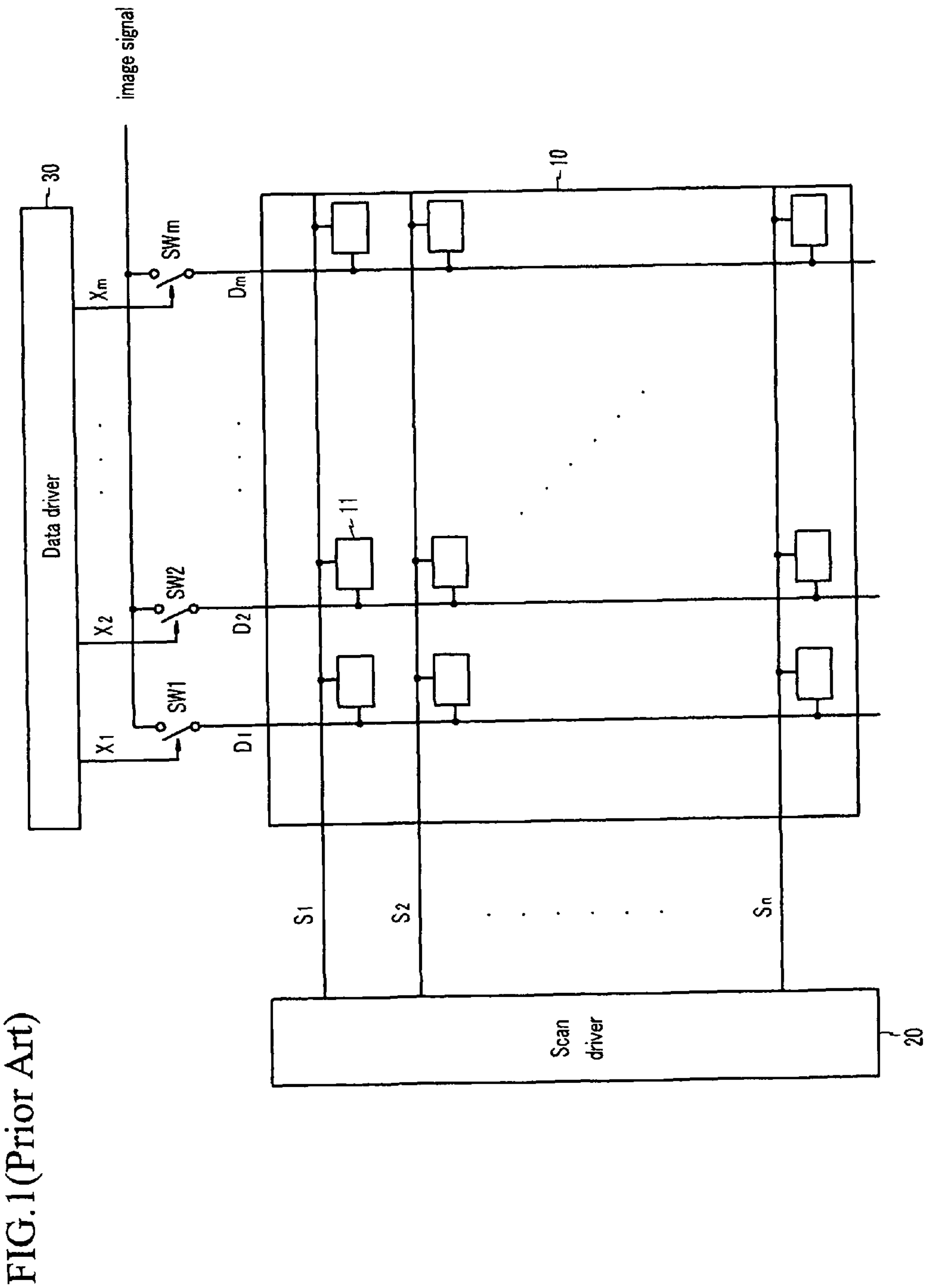
FIG.1(Prior Art)
FIG. 1 is a block diagram of a conventional OLED display.

In the following detailed description, exemplary embodiments of the present invention are shown and described by way of illustration. As those skilled in the art would recognize, the described exemplary embodiments may be modified in various ways, all without departing from the spirit or scope of the present invention. Accordingly, the drawings and description are to be regarded as illustrative in nature, rather than restrictive.

There may be parts shown in the drawings, or parts not shown in the drawings, that are not discussed in the specification as they are not essential to a complete understanding of the invention. Like reference numerals designate like elements.

Exemplary embodiments of the present invention will now be described in detail with reference to the drawings.

Figure 2:
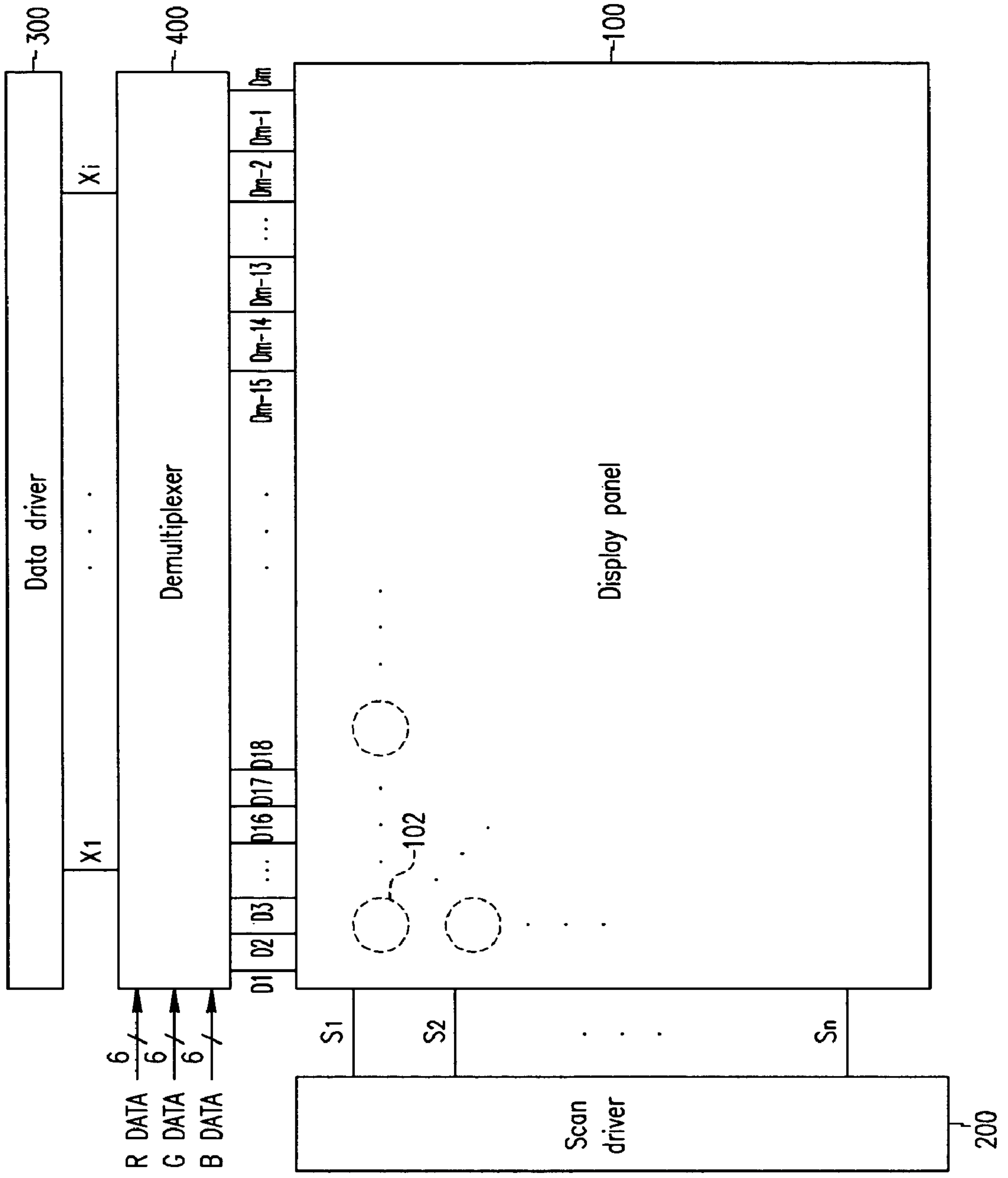
FIG. 2 is a block diagram of a display according to an exemplary embodiment of the present invention.

FIG. 2 is a block diagram of a display according to an exemplary embodiment of the present invention.

As shown in FIG. 2, the display according to the exemplary embodiment of the present invention includes a display panel 100, a scan driver 200, a data driver 300, and a demultiplexer 400.

The display panel 100 includes a plurality of data lines D1 to Dm, a plurality of scan line S1 to Sn, and a plurality of pixel circuits 102 coupled to the data lines and the scan lines. The plurality of data lines D1 to Dm are arranged in a column direction, and each data line is used to transmit a data current for displaying an image to corresponding pixel circuits 102. The plurality of scan lines S1 to Sn are arranged in a row direction, and each scan line is used to transmit a selection signal to corresponding pixel circuits 102. Each pixel is formed in an area defined by a neighboring data line and two neighboring scan lines.

The scan driver 200 sequentially applies the selection signal to the selection scan lines S1 to Sn, and the data driver 300 sequentially outputs the control signals X1 to Xi. The demultiplexer 400 applies an image signal (red, green, and blue data) to the plurality of data lines D1 to Dm in response to the control signals X1 to Xi from the data driver 300.

In the exemplary embodiment of the present invention, the image signal includes red, green, blue data, namely, R DATA, G DATA, and B DATA. The respective data is input through six respective channels (e.g., parallel data bus lines) in FIG. 2. However, the scope of the appended claims are not limited by a predetermined number of channels to which the image signal is input, and the image signal may be input using various different channels according to exemplary embodiments.

The demultiplexer 400 transmits red, green, and blue data input through the six respective channels to eighteen data lines in response to one control signal (i.e., one of the control signals X1 to Xi).

The scan driver 200, the data driver 300, and/or the multiplexer 400 may be coupled to the display panel 100, or formed, in the form of a chip, on a tape carried package (TCP). They may also be formed, in the form of a chip, on a flexible printed circuit (FPC) and a film which are coupled to the display panel. Otherwise, the scan driver 200, the data driver 300, and/or the multiplexer 400 may be directly formed on the glass substrate of the display panel 100 so that the selection/emission driver 200 and/or the data driver 300 may be substituted for driving circuits respectively formed on the same layers as those of the selection signal lines, data lines, and transistors.

Figure 3:
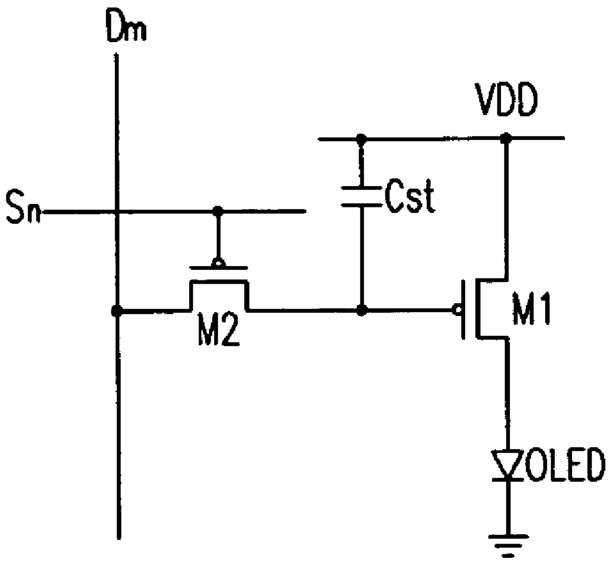
FIG. 3 is a circuit diagram of a pixel according to an exemplary embodiment of the present invention.

FIG. 3 is a circuit diagram of a pixel according to an exemplary embodiment of the present invention. The pixel illustrated in FIG. 3 is a pixel according to a voltage programming method. By way of example, the pixel of FIG. 3 may be used as one of the pixel circuits 102 of FIG. 2.

The pixel circuit includes a driving transistor M1, a switching transistor M2, a capacitor Cst, and an OLED.

The driving transistor M1 is coupled between a power source having a voltage of VDD and the OLED, and transmits a current corresponding to a voltage applied to its gate and source to the OLED. By way of example, when a metal-oxide-semiconductor (MOS) transistor having a p-type channel is provided as the driving transistor M1, a source of the driving transistor M1 is coupled to the power source of the voltage VDD, and a drain of the driving transistor M1 is coupled to an anode of the OLED. According to the exemplary embodiment of the present invention, a cathode of the OLED is coupled to a power source of the voltage VSS, and the voltage VSS is lower than the voltage VDD (e.g., the voltage VSS may be a negative voltage or a ground voltage).

The capacitor Cst is coupled between the gate and the source of the driving transistor M1, and the switching transistor M2 is coupled between the data line Dm and the gate of the driving transistor M1.

An operation of the pixel shown in FIG. 3 will now be described. The transistor M2 is turned on in response to a selection signal applied to the gate, a data voltage $V_{DATA}$ is applied to the gate of the transistor M1 from the data line Dm. A current of $I_{OLED}$ corresponding to a voltage of $V_{GS}$ charged by the capacitor C1 between the gate and the source of the transistor M1 is transmitted through the transistor M1, and the OLED is emitted in response to the current of $I_{OLED}$. Here, the current $I_{OLED}$ transmitted to the OLED is given as Equation 1.

$$I_{OLED} = \frac{\beta}{2}(V_{GS} - V_{TH})^2 = \frac{\beta}{2}(VDD - V_{DATA} - |V_{TH}|)^2 \quad \text{[Equation 1]}$$

where $V_{TH}$ denotes a threshold voltage of the transistor M1, and β denotes a constant.

As shown in Equation 1, the current of $I_{OLED}$ corresponding to the data voltage $V_{DATA}$ is supplied to the OLED in the pixel circuit shown in FIG. 3, and the OLED is emitted with a brightness corresponding to the supplied current. The applied data voltage has various values within a predetermined range in order to express predetermined gray scales.

While the exemplary embodiment of the present invention has been described above in reference to a pixel circuit formed on the display panel 100, pixel circuits according to various voltage programming methods or current programming methods may be formed on the display panel 100 according to exemplary embodiments.

Figure 4:
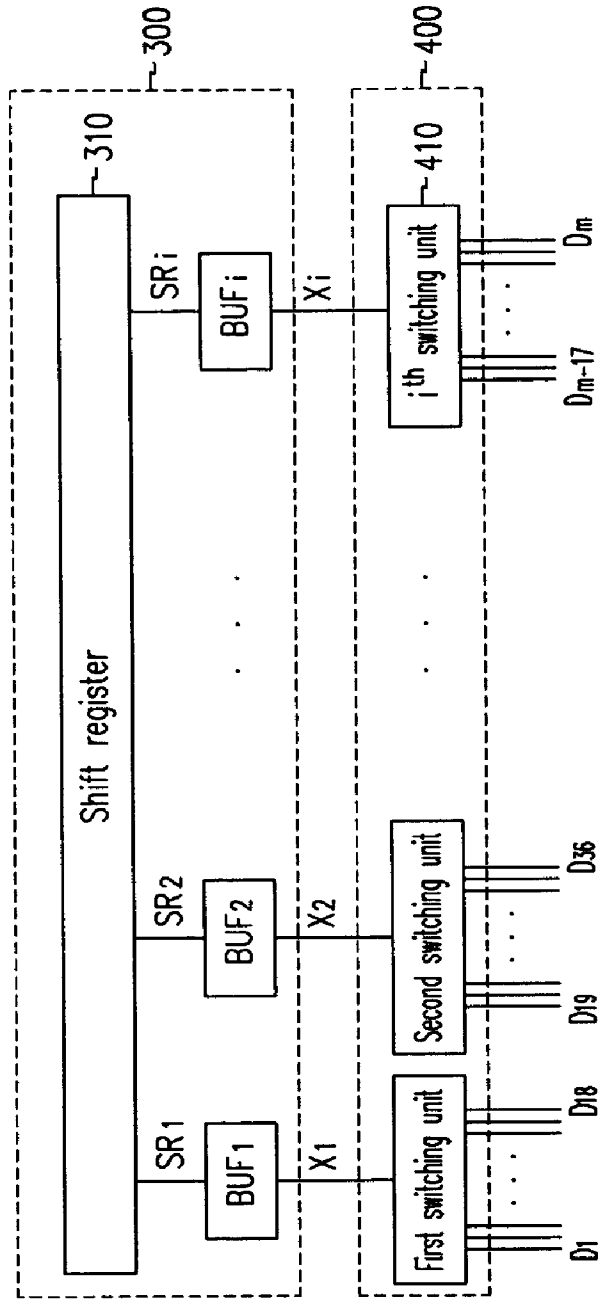
FIG. 4 is a block diagram that schematically shows a data driver and a demultiplexer according to a first exemplary embodiment of the present invention.

FIG. 4 is a block diagram that schematically shows the data driver 300 and the demultiplexer 400 according to a first exemplary embodiment of the present invention.

As shown in FIG. 4, the data driver 300 includes a shift register 310 for sequentially shifting a start signal (not illustrated) by synchronizing a clock signal (not illustrated), and buffers BUF1 to BUFi for buffering output signals SR1 to SRi of the shift register 310.

The demultiplexer 400 includes a plurality of switching units 410 for transmitting the image signals to the data lines in response to the output signals X1 to Xi, respectively, of the buffers BUF1 to BUFi.

When the image signals include the red, green, and blue data, and each data is input through the six channels, a first switching unit 410 receives eighteen image signals and transmits them to the data lines D1 to D18 in response to the output signal X1 of the buffer BUFi.

In the like manner, a second switching unit transmits the eighteen image signals to the data lines D19 to D36 in response to the output signal X2 of the buffer BUF2, and an $i^{th}$ switching unit transmits the eighteen image signals to the data lines D(m-17) to Dm in response to the output signal Xi of the buffer BUFi.

A demultiplexer according to the first exemplary embodiment of the present invention will now be described with reference to FIG. 5 and FIG. 6.

Figure 5:
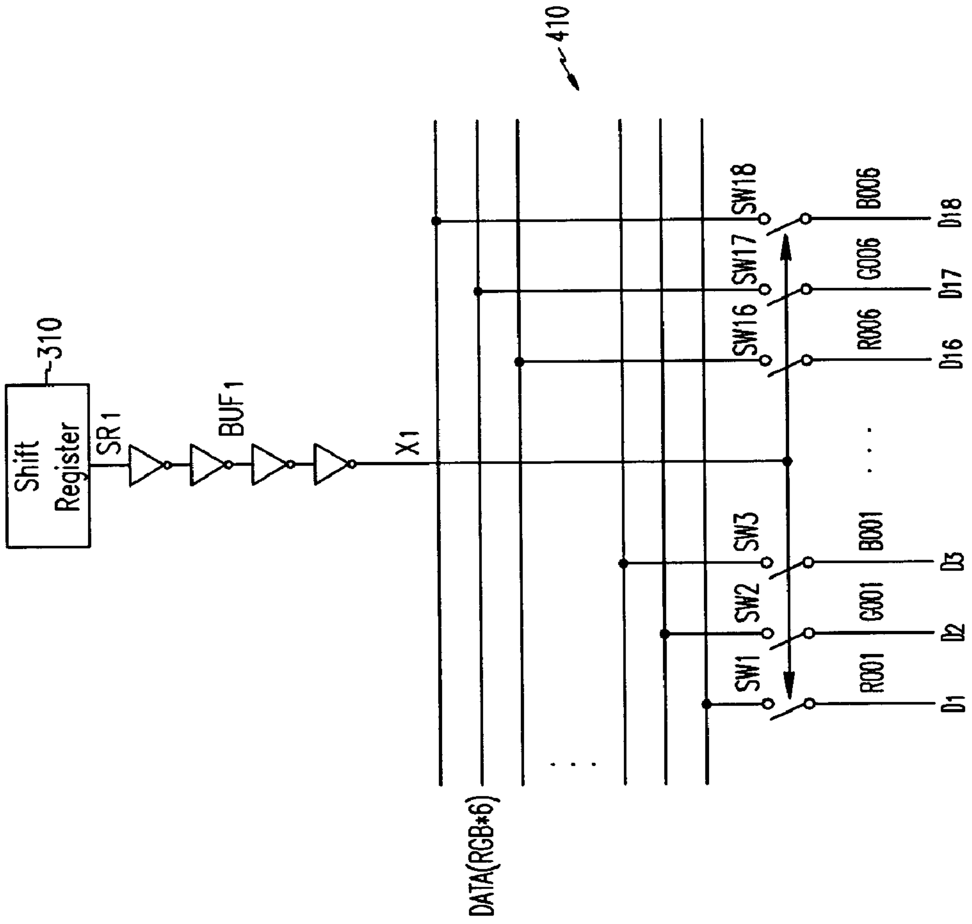
FIG. 5 is a detailed circuit diagram of a buffer of a data driver and a first switching unit among the data driver and the demultiplexer shown in FIG. 4.

FIG. 5 is a detailed circuit diagram of the data driver and the demultiplexer shown in FIG. 4. The buffer BUF1 for buffering the output signal SR1 of the shift register 310 of the data driver 300, and the first switching unit 410 among the plurality of switching units are illustrated, by way of example.

As shown in FIG. 5, the buffer BUF1 is formed by coupling even number of inverters in series, and the buffer BUF1 including four inverters is illustrated.

Eighteen signal lines are formed in a column direction and spaced apart from each other in a row direction in order to transmit the image signals, and switches SW1 to SW18 are coupled between the respective signal lines and data lines D1 to D18.

The eighteen switches SW1 to SW18 included in the first switching unit 410 are concurrently turned on by the output signal X1 of the buffer BUF1, and transmit data from the respective signal lines to the data lines D1 to D18. In other words, image data signals R001, G001, B001 through R006, G006, B006 are respectively applied to the data lines D1 to D18 through the switches SW1 to SW18.

According to the first exemplary embodiment of the present invention, as shown in FIG. 5, the signal line for transmitting the control signal X1 is applied at a center of the eighteen switches (i.e., between a ninth switch and a tenth switch) such that the control signal X1 is bi-directionally applied to the switches SW1 to SW18, and therefore a variation in time to transmit the control signal X1 to the eighteen switches SW1 to SW18 is reduced. In other words, the control signal X1 is transmitted to the switches SW1 to SW18 in two directions starting at the center location of the switches, such that the maximum time it takes for the control signal X1 to be applied to any particular switch of the eighteen switches is reduced.

That is, when one control signal X1 is applied to the plurality of switches SW1 to SW18, a resistance-capacitance RC delay is generated by parasitic resistance and capacitance in the signal line for transmitting the control signal X1, and the time to apply the signal X1 to the respective switches SW1 to SW18 has a variation.

Accordingly, when the signal X1 is transmitted from one side of the switches SW1 to SW18 in a direction, a time for applying the control signal X1 to a switch which is arranged far from the output terminal of the buffer BUF is delayed, a variation is generated between a switch which is near the output terminal of the buffer and a switch which is far from the output terminal, and therefore an error of the image signal applied to the data line is increased.

Accordingly, the output terminal of the buffer BUF1 is to be provided at a center of the switching unit 410, and therefore the variation in time to apply the output signal X1 of the buffer BUF1 to the switches SW1 to SW18 may be reduced.

Figure 6:
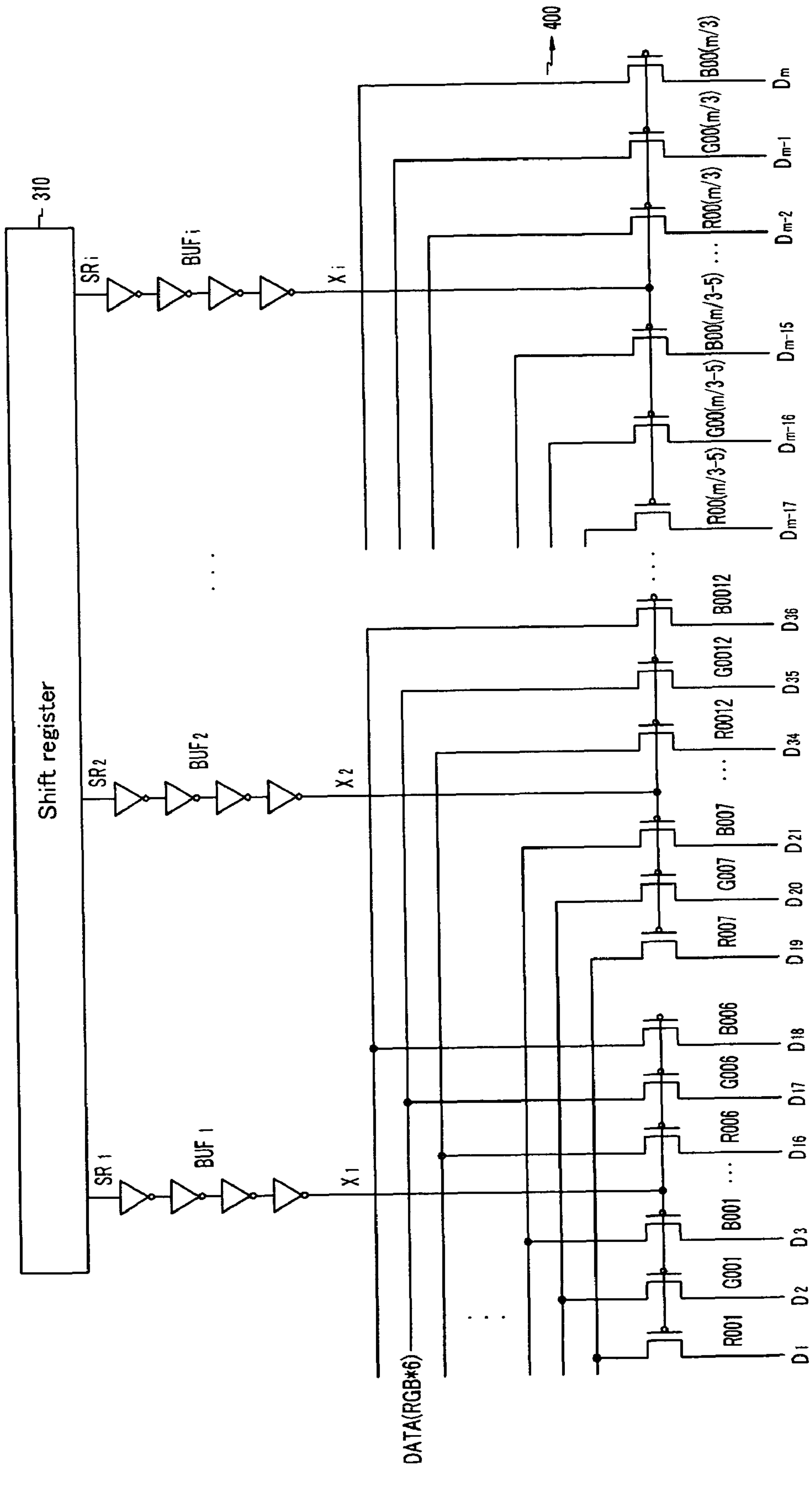
FIG. 6 is a circuit diagram of a data driver and a demultiplexer according to the first exemplary embodiment of the present invention.

FIG. 6 is a circuit diagram of the data driver and the demultiplexer according to the first exemplary embodiment of the present invention.

As show in FIG. 6, the signals SR1 to SRi of the shift register 310 are sequentially output, and the buffers BUF1 to BUFi buffers the signals SR1 to SRi and transmits the signals to the respective switching units.

The respectively control signals X1 to Xi output from the buffer BUF1 to BUFi are bi-directionally transmitted from the center of the respective switching units, and the switches transmit the image signals to the data lines D1 to Dm in response to the control signals X1 to Xi. As shown in FIG. 6, the control signal X1 is applied at the center of the first switching unit including switches for respectively providing image signals R001, G001, B001 through R006, G006, B006 to the data lines D1 to D18. In addition, the control signal X2 is applied at the center of the second switching unit including switches for respectively providing image signals R007, G007, B007 through R0012, G0012, B0012 to the data lines D19 to D36. In a similar manner, each switching unit provides eighteen image signals to respective eighteen data lines, ending with the ith switching unit that receives the control signal Xi at the center thereof, and includes switches for respectively providing image signals R00(m/3-5), G00(m/3-5), B00(m/3-5) through R00(m/3), G00(m/3), B00(m/3) to the data lines Dm-17 to Dm.

Accordingly, the variation in time to apply the respective output signals X1 to Xi of the buffer BUF1 to BUFi to the switches SW1 to SW18 in the switching units may be reduced, and the more exact image signals can be transmitted to the data lines. While the switches are depicted as PMOS transistors in FIG. 6, any other suitable switches or transistors can be used in other embodiments.

Figure 7:
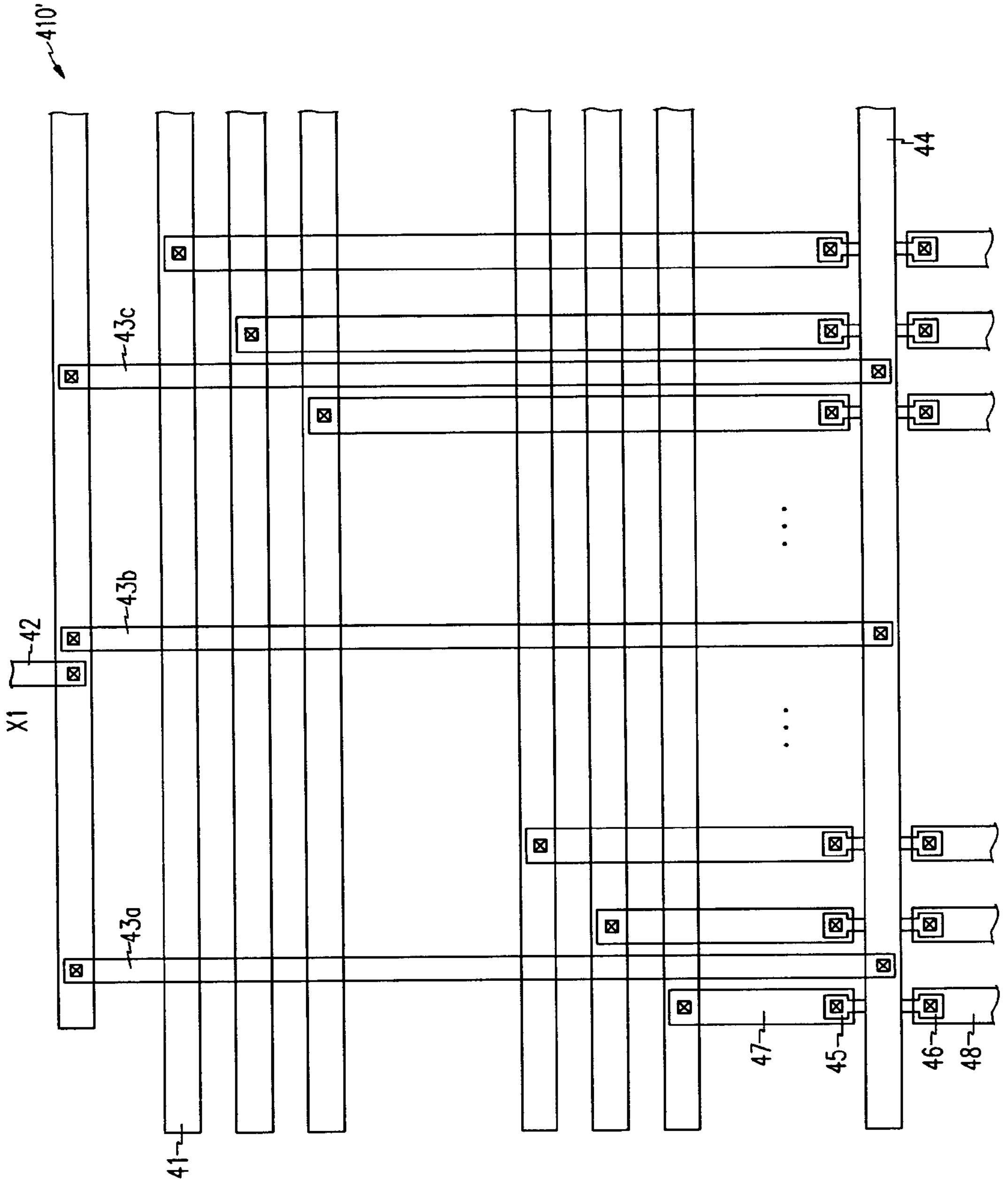
FIG. 7 is an arrangement of a demultiplexer according to a second exemplary embodiment of the present invention.

FIG. 7 shows an arrangement of a demultiplexer according to a second exemplary embodiment of the present invention, and a first switching unit 410' is illustrated, by way of example.

The switching unit 410' according to the second exemplary embodiment of the present invention is substantially the same as the switching unit 410 according to the first exemplary embodiment of the present invention except that the output signal X1 of the buffer BUF1 transmitted through a signal line 42 is transmitted to a gate electrode line 44 of the switches through three signal lines 43*a* to 43*c*.

Each of the eighteen switches in the switching unit is formed as a p-channel transistor. The gate electrodes of the eighteen transistors are formed by the gate electrode line 44, and a signal line 43*b* is coupled to a center of the gate electrode line 44. Signal lines 43*a* and 43*c* are symmetrically formed with respect to the signal line 43*b*.

A source electrode 45 of the transistor is coupled to a signal line 41 for transmitting the image data through a signal line 47, and a drain 46 of the transistor is coupled to the data line through an electrode 46 and a signal line 48.

Accordingly, the control signal X1 is applied to the signal line 42, and transmitted to the signal line 44 that forms the gate electrode of the switching transistors through the signal lines 43*a* to 43*c*. The transistor transmits the image data provided through the signal line 41 to the data line.

As described, when the control signal X1 is transmitted using the three signal lines 43*a* to 43*c*, the variation in time to apply the output signal to the plurality of switches may be reduced, and the more accurate image signal is transmitted to the data line.

It will be apparent to those skilled in the art that various modifications and variations can be made in the present invention without departing from the spirit or scope of the invention. Thus, it is intended that the present invention cover the modifications and variations of this invention that come within the scope of the claims and their equivalents.

While it has been described that the switches are formed as MOS transistors having a p-type channel, the present invention covers the modifications and variations of the switches provided that active elements perform a switching operation of two terminals in response to the applied control signal according to the exemplary embodiments.

What is claimed is:

1. A light emitting display comprising:

a plurality of first signal lines for supplying a data signal to display an image;

a display area comprising a plurality of data lines for transmitting the data signal, a plurality of scan lines for transmitting a selection signal, and a plurality of pixels coupled to the data lines and the scan lines;

a data driver for sequentially outputting a plurality of first control signals;

a scan driver for sequentially applying the selection signal to the scan lines;

a demultiplexer comprising a plurality of switching units for respectively transmitting the data signal to at least two data lines among the plurality of data lines in response to the first control signals;

the demultiplexer further comprising:

a plurality of second signal lines for applying the first control signals from the data driver to the switching units; and at least two third signal lines formed in parallel with and coupled to a corresponding one of the second signal lines, wherein at least one of the switching units comprises a plurality of switches for transmitting the data signal to the at least two data lines in response to a corresponding one of the first control signals, each of the plurality of switches respectively has a source terminal and a drain terminal, and the plurality of switches are respectively coupled between the plurality of first signal lines and the at least two data lines, wherein the corresponding one of the first control signals is applied to the at least one of the switching units at a predetermined point, such that the corresponding one of the first control signals is transmitted to the switches in at least two directions with respect to the predetermined point, wherein the plurality of switches in the at least one of the switching units in terms of their physical arrangements are symmetrically arranged with respect to the corresponding one of the second signal lines, wherein one of the at least two third signal lines is formed to extend in an area between two nearest ones of the plurality of switches, and the one of the at least two third signal lines is spaced from the two nearest ones of the plurality of switches, and the at least two third signal lines are coupled to the plurality of switches via a fourth signal line that is commonly connected to all of the plurality of switches and that is formed to extend in a direction perpendicular to the at least two third signal lines and crosses the plurality of switches such that all of the respective source terminals of the plurality of switches are formed on one side of the fourth signal line and all of the respective drain terminals of the plurality of switches are formed on an opposite side of the fourth signal line from the respective source terminals, and wherein each of the at least two third signal lines has a proximate end and a distal end, the respective proximate ends of the at least two third signal lines are coupled to the fourth signal line, and the respective distal ends of the at least two third signal lines are coupled to a fifth signal line that extends in parallel with the fourth signal line and is coupled to the corresponding one of the second signal lines.

2. The light emitting display of claim 1, wherein the at least two third signal lines are symmetrically located with respect to the corresponding one of the second signal lines.

3. The light emitting display of claim 1, wherein the plurality of switches are formed as MOS transistors, and a gate electrode of at least one of the switches included in the corresponding one of the switching units forms the fourth signal line.

4. The light emitting display of claim 3, wherein the corresponding one of the second signal lines is coupled to a center of the fourth signal line.

5. The light emitting display of claim 1, wherein at least one of the pixels comprises:

a driving transistor comprising first, second and third electrodes, the driving transistor for outputting a current corresponding to a voltage applied between the first and second electrodes at the third electrode;

a capacitor coupled between the first and second electrodes of the driving transistor; and a switching transistor for transmitting the data signal to the capacitor in response to the selection signal.

6. A display panel comprising:

a plurality of first signal lines for supplying a data signal to display an image;

a display area comprising a plurality of pixel circuits for displaying the image corresponding to the data signal and a plurality of data lines for transmitting the data signal to the pixel circuits;

a data driver for sequentially outputting a plurality of first control signals;

a plurality of switching units for sequentially transmitting the data signal to the data lines in response to the first control signals, wherein at least one of the switching units comprises a plurality of switching transistors that are respectively coupled between the plurality of first signal lines and at least two data lines among the plurality of data lines, each of the plurality of switching transistors respectively has a source terminal and a drain terminal, and gate electrodes of the switching transistors form a third signal line;

a plurality of second signal lines for transmitting the first control signals to the switching units; and at least two fourth signal lines formed in parallel with and coupled to a corresponding one of the second signal lines, wherein the corresponding one of the second signal lines is coupled to the third signal line so that lengths for transmitting the corresponding one of the first control signals to at least two switching transistors among the plurality of switching transistors in terms of their physical arrangements are substantially the same as each other, wherein one of the at least two fourth signal lines is formed to extend in an area between two nearest ones of the plurality of switching transistors, and the one of the at least two fourth signal lines is spaced from the two nearest ones of the plurality of switching transistors, and the at least two fourth signal lines are coupled to the third signal line that is commonly connected to all of the plurality of switching transistors and that is formed to extend in a direction perpendicular to the at least two fourth signal lines and crosses the plurality of switching transistors such that all of the respective source terminals of the plurality of switching transistors are formed on one side of the third signal line and all of the respective drain terminals of the plurality of switching transistors are formed on an opposite side of the third signal line from the respective source terminals, and wherein each of the at least two fourth signal lines has a proximate end and a distal end, the respective proximate ends of the at least two fourth signal lines are coupled to the third signal line, and the respective distal ends of the at least two fourth signal lines are coupled to a fifth signal line that extends in parallel with the third signal line and is coupled to the corresponding one of the second signal lines.

7. The display panel of claim 6, wherein the corresponding one of the second signal lines is formed in parallel to the switching transistors, and the plurality of switching transistors are symmetrically formed with respect to the corresponding one of the second signal lines.

8. The display panel of claim 6, wherein the at least two fourth signal lines are symmetrically formed with respect to the corresponding one of the second signal lines.

9. A demultiplexer for demultiplexing a data signal which is input through a plurality of first signal lines and for applying the data signal to a plurality of data lines in a display area comprising a plurality of pixel circuits for displaying an image corresponding to the data signal, comprising:

a plurality of second signal lines for transmitting a first control signal which is sequentially input;

a plurality of switching units for transmitting the data signal to the data lines in response to the first control signal; and at least two fourth signal lines in parallel with and coupled to a corresponding one of the second signal lines, wherein at least one of the switching units is coupled between the first signal lines and the data lines, and includes a plurality of switching transistors sharing a gate electrode that forms a third signal line, each of the plurality of switching transistors respectively has a source terminal and a drain terminal, and the corresponding one of the second signal lines is coupled to the third signal line so that the switching transistors in terms of their physical arrangements are symmetrically formed with respect to the corresponding one of the second signal lines, wherein one of the at least two fourth signal lines is formed to extend in an area between two nearest ones of the plurality of switching transistors, and the one of the at least two fourth signal lines is spaced from the two nearest ones of the plurality of switching transistors, and the at least two fourth signal lines are coupled to the third signal line that is commonly connected to all of the plurality of switching transistors and that is formed to extend in a direction perpendicular to the at least two fourth signal lines and crosses the plurality of switching transistors such that all of the respective source terminals of the plurality of switching transistors are formed on one side of the third signal line and all of the respective drain terminals of the plurality of switching transistors are formed on an opposite side of the third signal line from the respective source terminals, and wherein each of the at least two fourth signal lines has a proximate end and a distal end, the respective proximate ends of the at least two fourth signal lines are coupled to the third signal line, and the respective distal ends of the at least two fourth signal lines are coupled to a fifth signal line that extends in parallel with the third signal line and is coupled to the corresponding one of the second signal lines.

10. The demultiplexer of claim 9, wherein the at least two fourth signal lines are symmetrically formed with respect to the corresponding one of the second signal lines.

11. The light emitting display of claim 1, wherein the data signal comprises red, green and blue components.

12. The display panel of claim 6, wherein the data signal comprises red, green and blue components.

13. The demultiplexer of claim 9, wherein the data signal comprises red, green and blue components.

* * * * *